United States Patent
Rovik et al.

(10) Patent No.: US 10,628,819 B2
(45) Date of Patent: Apr. 21, 2020

(54) SYSTEM AND METHODS FOR AUTONOMOUS AND SEMI-AUTONOMOUS TOLL FACILITY NAVIGATION

(71) Applicant: Toyota Motor Engineering & Manufacturing North America, Inc., Erlanger, KY (US)

(72) Inventors: Christopher L. Rovik, Northville, MI (US); Eric R. Schmidt, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1113 days.

(21) Appl. No.: 15/017,379

(22) Filed: Feb. 5, 2016

(65) Prior Publication Data

US 2017/0228717 A1 Aug. 10, 2017

(51) Int. Cl.
*G06Q 20/28* (2012.01)
*G06Q 20/38* (2012.01)
(Continued)

(52) U.S. Cl.
CPC ........... *G06Q 20/28* (2013.01); *G06Q 20/085* (2013.01); *G06Q 20/102* (2013.01);
(Continued)

(58) Field of Classification Search
CPC .... G06Q 20/28; G06Q 20/085; G06Q 20/102; G06Q 20/145; G06Q 20/38; G07B 15/063; G07B 15/00
See application file for complete search history.

(56) References Cited

U.S. PATENT DOCUMENTS 5,410,486 A 4/1995 Kishi et al.
5,844,505 A 12/1998 Van Ryzin
(Continued)

FOREIGN PATENT DOCUMENTS

DE 102013212278 A1 * 12/2014 ............... G08G 1/00

OTHER PUBLICATIONS

Vason Srini, "A Vision for Supporting Autonomous Navigation in Urban Environments", Berkeley Wireless Research Center—Published by the IEE Computer Society, Dec. 1, 2006 (Year: 2006).*

*Primary Examiner* — Rupangini Singh
(74) *Attorney, Agent, or Firm* — Christopher G. Darrow; Darrow Mustafa PC

(57) ABSTRACT

A computing device for a vehicle is provided. The computing device includes one or more processors for controlling operation of the computing device, and a memory for storing data and program instructions usable by the one or more processors. The one or more processors are configured to execute instructions stored in the memory to determine when a vehicle is approaching a toll facility; locate available information relating to the toll facility; determine a type of toll payment desired; determine if, based on the available information, the vehicle can be autonomously driven into a payment lane that is in accordance with the type of toll payment desired; and if the vehicle can be autonomously driven into a payment lane that is in accordance with the type of toll payment desired, autonomously drive the vehicle into a payment lane that is in accordance with the type of toll payment desired.

20 Claims, 4 Drawing Sheets

(51) Int. Cl.
*G06Q 20/10* (2012.01)
*G06Q 20/14* (2012.01)
*G06Q 20/08* (2012.01)
*G07B 15/06* (2011.01)

(52) U.S. Cl.
CPC ......... *G06Q 20/145* (2013.01); *G07B 15/063* (2013.01); *G06Q 2240/00* (2013.01)

(56) References Cited

U.S. PATENT DOCUMENTS

| | | | |
|---|---|---|---|
| 6,140,943 | A | 10/2000 | Levine |
| 6,212,473 | B1 | 4/2001 | Stefan et al. |
| 6,505,118 | B2 | 1/2003 | Chowanic et al. |
| 6,901,330 | B1 | 5/2005 | Krull et al. |
| 6,944,538 | B2 | 9/2005 | Ishibashi et al. |
| 7,135,961 | B1 | 11/2006 | Operowsky et al. |
| 9,443,427 | B1 * | 9/2016 | Bhuiya ............... G06Q 10/02 |
| 2002/0128773 | A1 | 9/2002 | Chowanic et al. |
| 2013/0124348 | A1 * | 5/2013 | Lal ............... G06Q 20/204 705/17 |
| 2015/0235480 | A1 * | 8/2015 | Cudak ............... G05D 1/0027 701/2 |
| 2016/0209219 | A1 * | 7/2016 | Grush ............... H04W 4/029 |
| 2017/0046883 | A1 * | 2/2017 | Gordon ............... G07B 15/06 |

\* cited by examiner

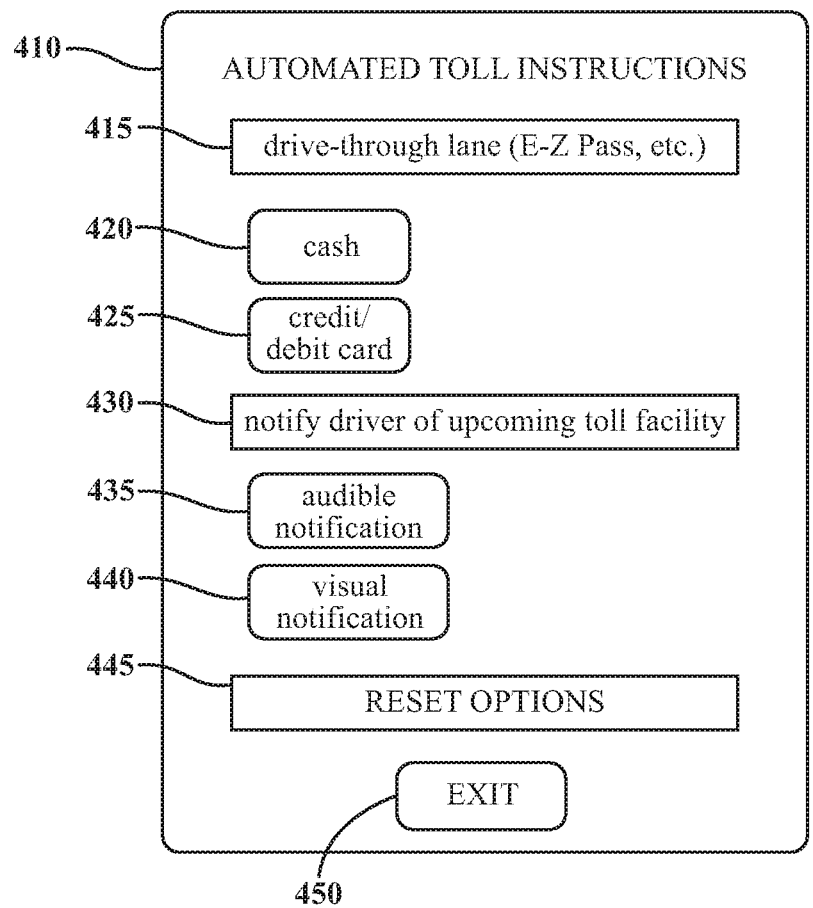
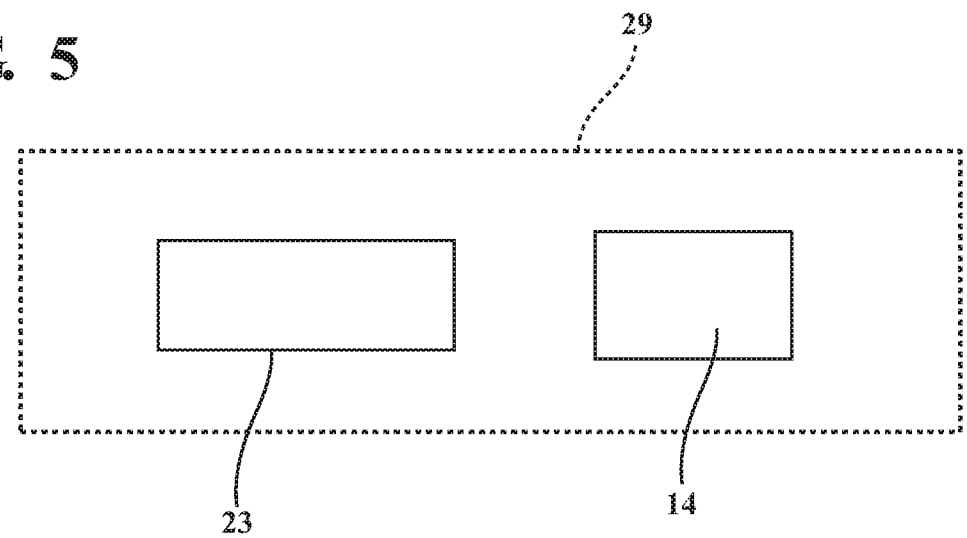

SYSTEM AND METHODS FOR AUTONOMOUS AND SEMI-AUTONOMOUS TOLL FACILITY NAVIGATION

TECHNICAL FIELD

The present disclosure relates to navigational aids, and, more particularly, to a system and method of autonomously navigating a vehicle through a toll facility in accordance with user payment preferences.

BACKGROUND

When driving on interstate highways, vehicles will frequently encounter toll facilities. Toll facilities typically enable payment of the tolls using various payment methods. However, the physical layouts of the various toll facilities, including the relative locations of the various types of payment lanes (cash, credit/debit card, pre-paid card or device), may differ from one facility to another. In addition, the layout of the payment lanes for a given facility may be difficult to determine prior to reaching the facility. This can increase the difficulty of locating the desired type of toll payment lanes, especially for autonomously driven vehicles. Therefore, it would be beneficial to have a system and method facilitating autonomous navigation of a toll facility in accordance with user payment preferences.

SUMMARY OF THE INVENTION

In one aspect of the embodiments described herein, a computing device for a vehicle is provided. The computing device includes one or more processors for controlling operation of the computing device, and a memory for storing data and program instructions usable by the one or more processors. The one or more processors are configured to execute instructions stored in the memory to determine when a vehicle is approaching a toll facility; locate available information relating to the toll facility; determine a type of toll payment desired; determine if, based on the available information, the vehicle can be autonomously driven into a payment lane that is in accordance with the type of toll payment desired; and if the vehicle can be autonomously driven into a payment lane that is in accordance with the type of toll payment desired, autonomously drive the vehicle into a payment lane that is in accordance with the type of toll payment desired.

In another aspect of the embodiments described herein, a method for navigating a vehicle through a toll facility is provided. The method includes steps of determining when a vehicle is approaching a toll facility; locating available information relating to the toll facility; determining a type of toll payment desired; determining if, based on the available information, the vehicle can be autonomously driven into a payment lane that is in accordance with the type of toll payment desired; and if the vehicle can be autonomously driven into a payment lane that is in accordance with the type of toll payment desired, autonomously driving the vehicle into a payment lane that is in accordance with the type of toll payment desired.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 4 is a schematic view of one example of an interactive screen display configured to enable user entry of instructions to be automatically executed whenever the vehicle is determined to be approaching a toll facility.

FIG. 5 is a schematic view of a navigation system including a computing device in accordance with an embodiment described herein.

DETAILED DESCRIPTION

The embodiments described herein relate to autonomous navigation of vehicle toll facilities. A vehicle control system is designed to be configurable to autonomously drive to a suitable payment lane of a toll facility, based on a previously determined preferred type of payment (cash, debit/credit card, pre-paid toll payment account) which has been stored in the control system. If no preferred payment type has been previously determined and stored, a user may be notified that the vehicle is approaching a toll facility and queried by the control system regarding a preferred payment type for that particular toll facility. The vehicle will then seek to automatically navigate the vehicle into an appropriate payment lane.

As will be appreciated by one skilled in the pertinent the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
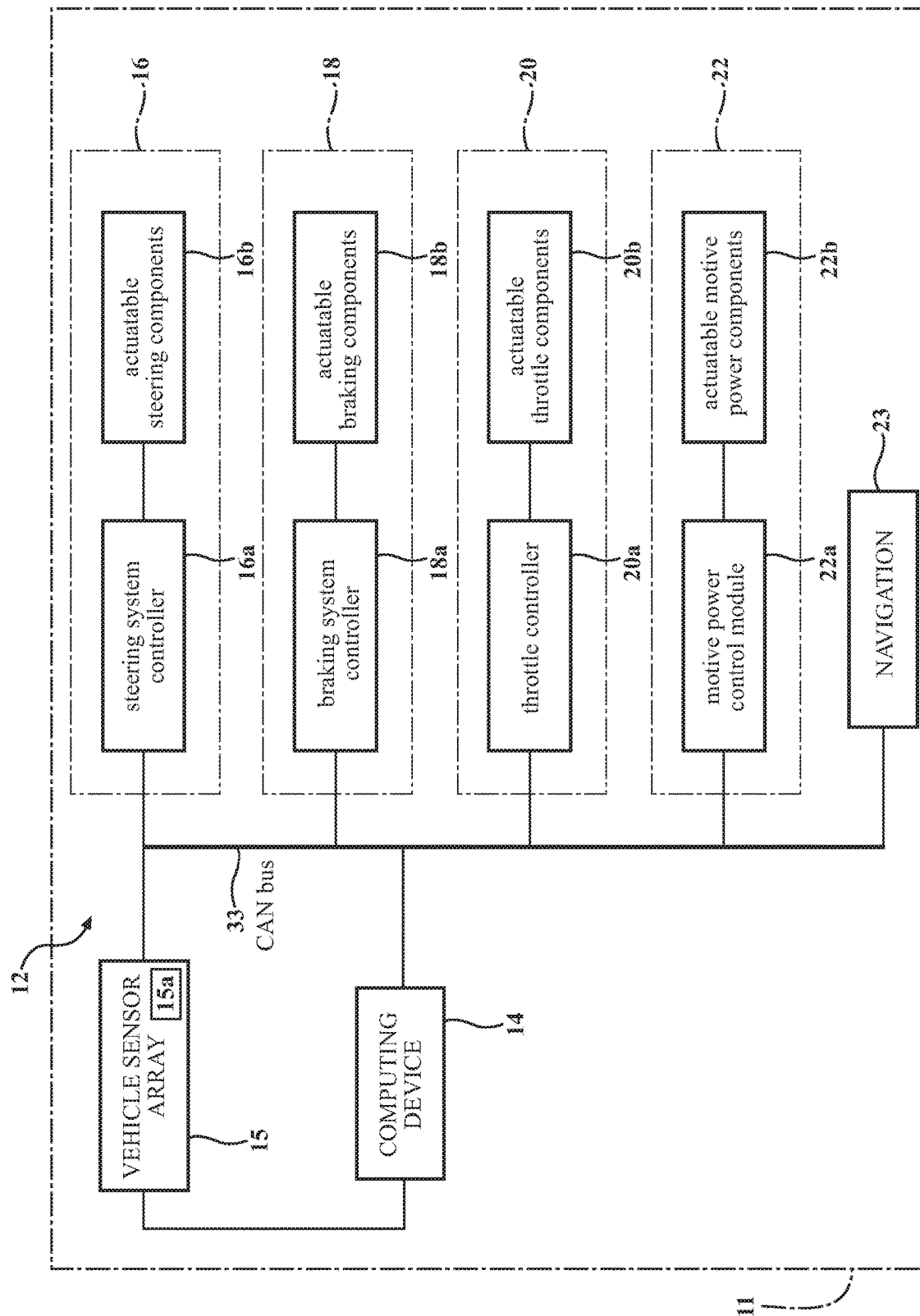
FIG. 1 is shows a schematic arrangement of a portion of a vehicle control system configured for at least partially autonomous control of a vehicle, for the purposes described herein.

FIG. 1 is shows a schematic arrangement of a portion of a vehicle control system 12 configured for at least partially autonomous control of a vehicle 11, for the purposes described herein. The vehicle control system 12 is also configured to enable the vehicle 11 to be driven totally under manual control if desired by a user, in an emergency, or in the event that one or more autonomous systems become impaired or unavailable, for example. The control system 12 includes a computing device 14 and a sensor array 15 in operative communication with the computing device. A plurality of control sub-systems 16, 18, 20, 22, 23 is in operative communication with the sensor array 15 and computing device 14. Each of systems 16, 18, 20, 22, 23 is configured for autonomous operation. For example, the embodiment shown in FIG. 1 includes four primary control systems (an autonomous steering control system 16, an autonomous braking control system 18, an autonomous throttle control system 20, an autonomous motive power control system 22), and a non-primary system (autonomous navigation module 23). A "primary control system" or "primary system" is a system designed to effect control and operation of one of the primary vehicle controls (i.e., brake, steering, throttle, and motive power), as defined above.

Navigation module 23 may be, for example, a known navigation system receiver (for example, a GPS receiver) configured to receive vehicle location information from a navigation system, such as a GPS system (not shown). However, navigation module 23 may have any alternative form or configuration suitable for the purposes described herein. Module 23 is also configured to operatively communicate with computing device 14 for providing vehicle navigational information for the purposes described herein. Computing device may incorporate a suitable navigational interface 123 if needed to facilitate operative communication with navigation module 23. Module 23 may have GPS maps or other navigational information stored thereon.

Each automated sub-system may include an associated specialized controller which is in operative communication with associated actuatable elements operable responsive to control commands received from the controller. For example, braking control system 18 effects automated control of vehicle braking and includes a braking system controller 18a and various actuatable elements (brakes, etc.) 18b necessary for executing braking control commands and configured to be operable responsive to control commands received from the braking controller. Steering system 16 includes a steering system controller 16a in operative communication with associated actuatable steering components 16b necessary for executing steering control commands. Throttle system 20 includes a throttle controller 20a in operative communication with associated actuatable throttle components 20b necessary for executing throttle control commands. Motive power system 22 includes a motive power system controller 22a in operative communication with associated actuatable motive power components 22b necessary for executing motive power control commands. Examples of specific systems and/or capabilities which may be incorporated into the vehicle control system include adaptive cruise control, electronic stability control, automated lane centering, forward collision warning, lane departure warning, and blind spot monitoring. Additional controls, systems and/or capabilities may be provided if needed to perform the functions described herein, depending on the design of a particular vehicle. The vehicle embodiments described herein are assumed to have sufficient autonomous systems and/or capabilities to execute the various operations described herein, and to provide the user notifications and control transfers (from manual to autonomous operation, and vice versa) described herein. Examples of autonomous capabilities which may be enabled in the vehicle 11 include autonomous cruise control, automatic braking, and lane keeping.

The control system 12 may be configured so that the various controllers, sensors and other elements of the system can communicate with each other using a controller area network (CAN) bus 33 (FIG. 1) or the like. Via the CAN bus and/or other wired or wireless mechanisms, the computing device 14 may transmit messages to various devices in the vehicle and/or receive messages from the various devices, e.g., controllers, actuators, sensors, etc.

Figure 2:
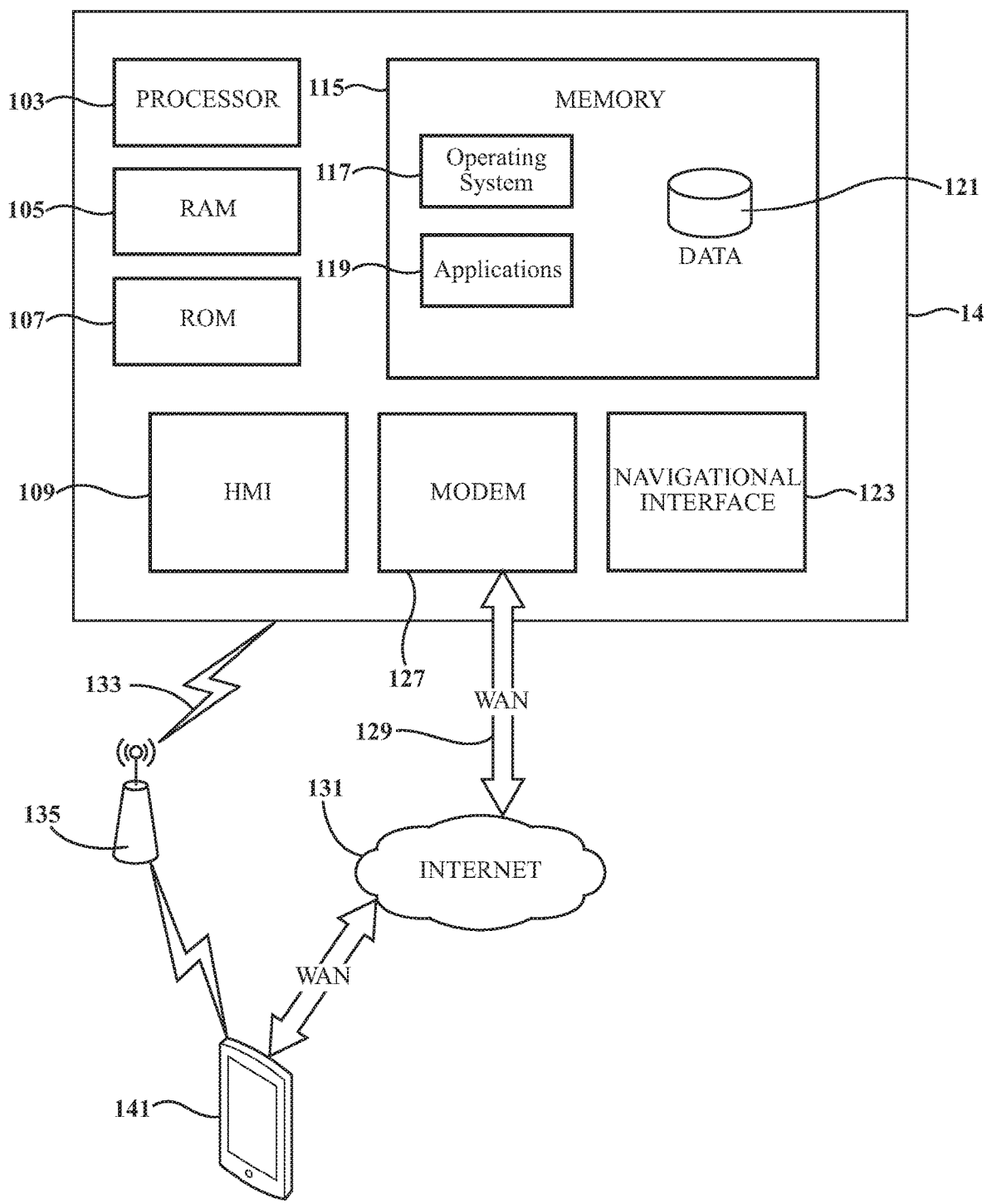
FIG. 2 is a block diagram of a computing device in the vehicle control system of FIG. 1.

FIG. 2 illustrates a block diagram of a computing device 14 in the vehicle control system 12 that may be used according to one or more illustrative embodiments of the disclosure. The computing device 14 may have a processor 103 for controlling overall operation of the device 14 and its associated components, including RAM 105, ROM 107, an input/output module or human-machine interface (HMI) 109, and computer-readable storage or memory 115. The computing device 14, along with one or more additional computing devices (e.g., specialized controllers 16a, 18a, 20a, 22a, 23, terminals 141, 151) and other devices may correspond to any of multiple systems or devices configured as described herein for functions such as autonomously (i.e., without vehicle operator or occupant input) operating the entire vehicle or specific portions of the vehicle. Computing device 14 may be embodied in a vehicle controller, for example.

Computing device 14 may be configured to serve as an autonomous driving module, coordinating operations of the specialized controllers 16a, 18a, 20a, 22a, 23 and controlling (or assisting in coordinated control of) all autonomous driving operations, including steering, braking, etc. Computing device 14 may also be configured to operate the various vehicle systems and components so as to execute various autonomous commands or maneuvers (for example, vehicle starts and stops, lane changes, etc.) needed to execute the maneuvers and/or operations described herein. Computing device 14 may also be configured to operatively communicate with navigation module 23 as previously described.

Computing device 14 may also be configured to receive and store information from the sensor array 15, from any of specialized control modules 16a, 18a, 20a, 22a, 23 and from any other vehicle components pertaining to operation of the automated vehicle control systems. The computing device 14 may also be configured to receive and store the information so that all of the information is time-correlated and may be processed for diagnostic purposes.

A computer-readable storage or memory 115 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Input/Output (I/O) module or HMI 109 may include a microphone, keypad, touch screen, and/or stylus through which a user of the computing device 14 may provide input, and may also include one or more of a speaker for providing audio output and a video display device for providing textual, audiovisual and/or graphical output. Software may be stored within memory 115 and/or storage to provide instructions to processor 103 for enabling device 14 to perform various functions. For example, memory 115 may store software used by the device 14, such as an operating system 117, application programs 119, and an associated internal database 121. Processor 103 and its associated components may allow the computing device 14 to execute a series of computer-readable instructions to receive occupant feedback and to perform other interface-related functions as described herein. The interface 109 may incorporate and implement a voice recognition routine, allowing the control system to present information and selection options through a speaker, and to receive driver input through a microphone.

The visual and voice interfaces described herein may be embodied in any one of a variety of computing devices including a processor and a memory, as well as communication capabilities. For example, the interfaces may operate on a portable computer, tablet computer, a smart phone, etc. that includes capabilities for wireless communications using IEEE 802.11, Bluetooth, and/or cellular communications protocols. Further, the device implementing the interface may use such communication capabilities to communicate with a vehicle computing device 14. A device could communicate with a vehicle computer 14 via other mechanisms such as a network in the vehicle, a known protocol such as Bluetooth, etc. Accordingly, the user device may be used to carry out certain operations herein ascribed to a data collector (e.g., voice recognition functions, cameras, global positioning system (GPS) functions, etc.), and the user device could be used to provide data to the computing device 14, and may be used to provide a human machine interface (HMI) to the computing device 14. Thus, the visual and voice interfaces described herein may be embodied in one or more application programs in a cellular phone, PDA, or other wireless device, for example. These embodiments of the interfaces may enable communication with the vehicle control system without the need installation of a touch screen or audio equipment in the vehicle interior. In another embodiment, the wireless device may communicate with the vehicle control system via a suitable docking station or port residing in the vehicle interior.

The various computing devices may operate in a networked environment supporting connections to one or more remote computers, such as terminals (not shown) or wireless device(s) 141. Computing device 14 and any other computing devices and related devices 141 or terminals, may include devices installed in vehicles, mobile devices that may travel within vehicles, or devices outside of vehicles that are configured to receive and process vehicle and driving data. Thus, the computing device 14 and related devices 141 or terminals may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband) and the like)(not shown), and may include some or all of the elements described above with respect to the computing device 14. In addition, any of these computing device embodiments may include a haptic interface or may be configured to provide haptic feedback to a vehicle occupant to inform the occupant of a change in automation status, an active or pending alert, or any other status or condition which should be communicated to the occupant. The network connections depicted in FIG. 2 include a wide area network (WAN) 129 and a wireless telecommunications network 133, but may also include other networks. When used in a WAN networking environment, the device 14 may include a modem 127 or other means for establishing communications over the WAN 129, such as network 131 (e.g., the Internet). When used in a wireless telecommunications network 133, the device 14 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133. These configurations may be helpful in providing information such as toll locations, costs, payment options, and other information useable by the vehicle occupants in decision making.

It will be appreciated that the network connections shown are illustrative and other means of establishing a communications link between the various computing devices may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Control system 12 includes an array 15 of vehicle sensors designed to monitor various vehicle operational parameters and environmental conditions external to the vehicle. In a known manner, the vehicle sensors provide data used by the various controllers in formulating and executing suitable control commands in the autonomous vehicle systems 16, 18, 20, 22, 23. For example, data from inertial sensors, wheel speed sensors, road condition sensors, and steering angle sensors may be processed in formulating and executing a command in steering system 16 to turn the vehicle. Examples (not shown) of sensors that may be incorporated into a semi-autonomous or fully autonomous vehicle sensor array include radar and lidar systems, laser scanners, vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

For example, the sensor array 15 may include various types of sensors in communication with other control system components, for providing feedback on operations of the vehicle. For example, sensors 15 may detect and store data corresponding to the vehicle's location (e.g., GPS coordinates), speed and direction, rates of acceleration or braking, and specific instances of sudden acceleration, braking, and swerving. Sensors 15 also may detect and store data received from the vehicle's internal systems, relating to such factors as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's various computing devices.

Additional ones of sensors 15 may detect and store information relating to external driving conditions, for example, external temperature, rain, snow, light levels, and sun position for driver visibility. For example, external cameras and proximity sensors, radar, lidar and other types of sensors may detect other nearby vehicles, traffic levels, road conditions, traffic obstructions, animals, cyclists, pedestrians, and other conditions that may factor into a driving event data analysis. Sensors 15 also may detect and store data relating to moving violations and the observance of traffic signals and signs by the vehicle. Additional ones of sensors 15 may detect and store data relating to the maintenance of the vehicle, such as the engine status, oil level, engine coolant temperature, odometer reading, the level of fuel in the fuel tank, engine revolutions per minute (RPMs), and/or tire pressure.

Vehicle sensors 15 also may include cameras and/or proximity sensors capable of recording additional conditions inside or outside of the vehicle. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensors 15 also may be configured to collect data a driver's movements or the condition of a driver. For example, vehicle may include sensors that monitor a driver's movements, such as the driver's eye position and/or head position, etc. Additional ones of sensors 15 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

In a particular embodiment, sensors 15 include a camera or vision system 15a configured to capture images of road and street signs (including overhead signs), traffic signs, speed limit signs, signs indicating an upcoming toll facility and/or other signs present along the vehicle route, in front of and to the sides of the vehicle. In a manner known in the art, the vision system 15a may supply the imaged areas as a video signal (e.g., as bit map data) to computing device 14. In this embodiment of the system 12, computing device 14 incorporates therein optical character recognition software which enables the computing device 14 to convert the supplied video signals into (and/or associate the received image with) a recognized road sign by utilizing various information within the supplied video signal including the text sign data (i.e., the words printed on the sign), the sign image shape, and the sign image color(s), in a manner known in the art.

The computing device 14 may be configured to access (either in memory 115 or through navigation module 23) vehicle location information base to determine the current location of the vehicle. The vehicle location information may include information pertaining to road names and numbers, road vectors, highway exits, town/country/state names, as well as any other data that may be useful navigating the vehicle. Using the optical character recognition software, the recognized road sign may be associated with a known road number, road name, town name, a road direction (e.g., north, south, east or west), a mile marker, etc.

The control system may also be configured to provide (via interface 109) a visual and/or audible notification that the vehicle is approaching a toll facility. For example, if the vehicle is approaching a toll facility (as imaged by the vision system 15a or as indicated in the navigation system data base), computing device 14 may supply via HMI 109 the audio message "toll plaza ahead". In addition, a notification may be provided including information relating to the particular toll and/or toll facility (including cost, available payment methods, etc.) if such information is available or obtainable by the network shown in FIG. 2.

Certain of vehicle sensors 15 also may collect information regarding the driver's route choice, whether the driver follows a given route, and to classify the type of trip (e.g. commute, errand, new route, etc.). In certain embodiments, sensors and/or cameras may determine when and how often the vehicle stays in a single lane or stray into other lanes. A Global Positioning System (GPS), locational sensors positioned inside the vehicle, and/or locational sensors or devices external to the vehicle may be used determine the route, lane position, and other vehicle position/location data.

The data collected by vehicle sensors 15 may be stored and/or analyzed within the vehicle and/or may be transmitted to one or more external devices. For example, the sensor data may be transmitted via telematics devices to one or more remote computing devices, such as a mobile device or laptop computer. Any data collected by vehicle sensors 15 may also be transmitted to any vehicle system or component requiring or utilizing the data for the purposes described herein. For example, the data collected by vehicle sensors 15 may be transmitted to vehicle controller 14, to one or more specialized component controllers, or to the HMI 109.

Particular vehicle sensors may be incorporated into one of the specialized vehicle controllers 16a, 18a, 20a, 22a. Particular vehicle sensors may also configured to provide inputs to more than one vehicle control system. For example, in a vehicle incorporating both automated steering and braking control, various road condition sensors may provide data to both the steering system controller and the braking controller to enable these controllers to process the road condition information in accordance with stored processor-executable instructions, and to formulate appropriate control commands to the steering system and braking system. In addition, the various specialized controllers 16a, 18a, 20a, 22a in the vehicle may operate effectively as sensors or as data collectors to provide data or inputs via the CAN bus 33 enabling communication between the elements of the control system.

FIG. 1 shows just a few examples of automated vehicle sub-systems 16, 18, 20, 22, 23 which may be incorporated into a vehicle. A particular vehicle may incorporate one or more of these systems or other systems (not shown) in addition to one or more of the systems shown.

If a controller requires an integrated or composite signal formed from outputs of multiple individual sensors, a known sensor fusion means (incorporating, for example, a suitable Kalman filter) may be introduced between the sensor array (or the pertinent sensor(s)) and the pertinent controller or incorporated into the controller. Also, if a sensor output signal requires pre-processing prior to use by a controller, a known pre-processing means (for example, an A/D converter) may be introduced between the sensor array (or the pertinent sensor(s)) and the pertinent controller or incorporated into the controller. Similarly, if operation of any actuatable sub-system components will require processing of a control signal received from a controller, a known processing means (for example, an A/D converter) may be introduced between the controller and the actuatable components or incorporated into the controller.

Figure 3:
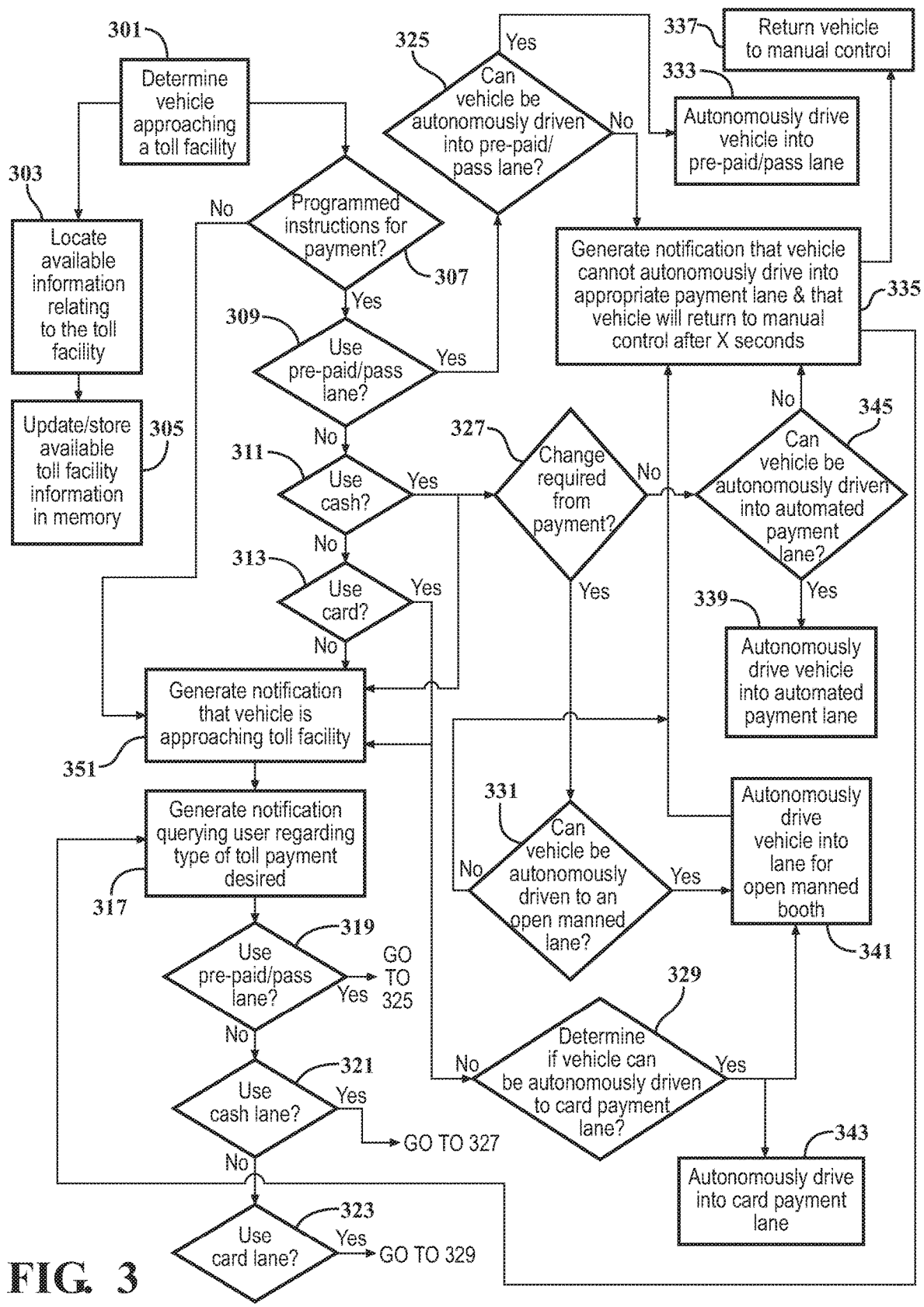
FIG. 3 shows a flow diagram of one embodiment of an autonomous toll facility navigation operation which may be performed by the vehicle control system.

FIG. 3 shows a flow diagram of one embodiment of a toll facility navigation operation that may be performed by an embodiment of the vehicle control system 12 described herein. Various embodiments of the toll facility navigation operation may be performed with autonomously (with no user input during toll navigation) or semi-autonomously (with varying degrees of user input).

Referring to FIG. 3, in block 301, through constant monitoring of the road ahead of the vehicle (including imaging and interpretation of road signs by vision system 15a), comparison of the current vehicle location with GPS coordinates of known toll facilities in the navigation system, and comparison of the current vehicle location with coordinates or navigation information relating to known toll facilities saved in memory (for example, in memory 115), the computing device 14 determines if and when the vehicle 11 is approaching a toll facility.

In block 303, the computing device 14 may locate available information relating to the upcoming toll facility. Such information may come from, for example, imaging and interpretation of road signs by vision system 15*a*, navigation system information relating to the toll facility, information stored in memory 115, and any other suitable source accessible by the computing device, either wirelessly or through a wired connection. Information gathered by imaging and interpretation of road signs by vision system 15*a* and other sensors may be constantly received by the computing device and updated (in block 305) in memory for evaluation and comparison as the vehicle continues to approach the toll facility.

The types of toll facility information which may be stored for a given toll facility include the GPS or other navigational coordinates of the toll facility, the cost of the toll, the relative lateral location (i.e., along the width of the road or the width of a road exit to a toll plaza) of each type of payment lane (i.e., cash, credit card, debit card, etc.), and any other information pertinent to notifying the user of an approaching toll facility, enabling the user to select and prepare a desired form of payment prior to reaching the toll facility, and guiding the vehicle into an appropriate payment lane. For example, the computing device may incorporate visual recognition routines and reference files enabling the computing device to process images from the vision system, to identify such features as the locations of manned toll booths and cash payment booths relative to the vehicle current position. This capability may aid the computing device in generating notification to a driver including the direction in which the vehicle must be steered and the locations of desired payment lanes. The capability also aids in autonomously driving the vehicle toward the desired payment lanes.

The computing device 14 may also be configured to compare stored toll facility information with newly received information, and to update the stored information if inconsistent with the newly received information. The computing device 14 may also be configured to add to memory information that was absent or previously unavailable.

In block 307, the computing device determines if the system contains any previously programmed instructions with regard to toll payment. Such instructions may be entered, for example, by a user through interface 109 using a touch screen (for example, screen 410 in FIG. 4) using the procedure described herein. Such instructions may relate to the type of toll payment preferred by the user. Block 307 may be executed simultaneously with block 303.

In block 309, if computing device 14 determines that a pre-paid pass (for example, an E-Z Pass®, I-Pass or similar device) is to be used for payment, control transfers to block 325.

In block 325, the computing device 14 may determine if the vehicle can be autonomously driven into one of the pre-paid/pass lanes. Factors affecting this determination include access to information regarding where the pre-paid/pass lanes are located in relation to the current position of the vehicle, and other factors. This information may be obtained, for example, from analysis of the vision system road sign images to aid in determining the positions of the pre-paid/pass lanes in the field of view of the vision system camera, and relative to the current lateral position or lane in which the vehicle is driving in. When the vehicle is being driven autonomously, there must be sufficient information available to the computing device 14 and the vehicle control system 12 to enable autonomous direction of the vehicle into one of the one of the pre-paid/pass lanes, or control will transfer to block 335.

In block 333, if sufficient information is available to autonomously guide the vehicle into one of the one of the pre-paid/pass lanes, the vehicle is guided into one of the lanes. Thus, if payment may be made using a pre-paid/pass lane, and if sufficient information is available to autonomously guide the vehicle into one of the one of the pre-paid/pass lanes, the vehicle may be autonomously guided through the toll facility without the need to notify the vehicle occupants.

In block 335, if sufficient information is not available to autonomously guide the vehicle into one of the one of the pre-paid/pass lanes, the computing device 14 generates a notification that the vehicle cannot be autonomously driven into the appropriate payment lane, and that the vehicle will return to manual control after a suitable notice period (for example, 30 seconds).

Referring back to block 311, if the computing device determines that instructions exist for the toll payment to be made in cash, control is transferred to block 327.

In block 327, the computing device may then generate notification querying the user via interface 109 as to whether the user will require change from the toll payment. Simultaneously with execution of block 327 or otherwise after block 311, in block 351, the computing device 14 may generate a notification that the vehicle is approaching the toll facility. The notification may be a visual or audible notification presented, for example, via interface 109.

Referring back to block 327, if the user will not require change, the device 14 determines (in block 345) if the vehicle can be autonomously driven into an automated cash payment lane. Factors affecting this determination include access to information regarding where the automated payment lanes are located in relation to the current position of the vehicle and other factors. This information may be obtained, for example, from analysis of the vision system road sign images to aid in determining the positions of the automated payment lanes in the field of view of the vision system camera, and relative to the current lateral position or lane in which the vehicle is driving in. When the vehicle is being driven autonomously, there must be sufficient information available to the computing device 14 and the vehicle control system 12 to enable autonomous direction of the vehicle into one of the one of the automated payment lanes, or control will transfer to block 335.

If sufficient information is not available to autonomously guide the vehicle into one of the one of the automated payment lanes, in block 335, the computing device 14 generates a notification that the vehicle cannot be autonomously driven into the appropriate payment lane, and that the vehicle will return to manual control after a suitable notice period (for example, 30 seconds). Then, in block 337, after expiration of the notice period, the vehicle reverts from autonomous control to manual control to enable the driver to manually guide the vehicle to the desired payment location at the toll facility.

Referring to block 339, if it is determined that the vehicle can be autonomously driven into one of the automated payment lanes, the control system 12 autonomously drives the vehicle into an automated payment lane, where payment may be made.

Referring again to block 327, if the user will require change, the device 14 determines (in block 331) if vehicle can be autonomously driven to an open manned toll booth lane so that change may be obtained from a cash payment.

Factors affecting this determination include access to information regarding where the manned toll booth lanes are located in relation to the current position of the vehicle and other factors. This information may be obtained, for example, from analysis of the vision system road sign images to aid in determining the positions of the manned toll booth lanes in the field of view of the vision system camera, and relative to the current lateral position or lane in which the vehicle is driving in. One consideration when attempting to autonomously direct the vehicle toward a manual payment lane is whether the lane is "open" or "closed". Using the vision system and optical recognition capability, the computing device may be configured to distinguish an open lane from a closed lane based on, for example, interpretation of any lighted signs and text appearing over or adjacent to an associated payment lane. The computing device 14 may be configured to use the relative positions of lanes having these features within the camera field of vision, to guide the vehicle into an appropriate payment lane. As the vehicle approaches a toll payment area, when the lane boundaries become distinct, the vehicle may be guided into a specific lane using the vehicle lane marker or lane keeping system. When the vehicle is being driven autonomously, there must be sufficient information available to the computing device 14 and the vehicle control system 12 to enable autonomous direction of the vehicle into one of the one of the manned toll booth lanes, or control will transfer to block 335. For example, in a case where the system 12 determines that all of the manual payment lanes are closed, or in a case where the system cannot distinguish an open manual payment lane from a closed one, control will transfer to block 335.

In a particular embodiment, and barring the presence of information to the contrary, if manual payment of the toll is desired, the system 12 may be configured to bias the vehicle toward lanes located along the right side of the toll facility payment lanes. This may facilitate location a suitable manual payment lane or booth, assuming that a manual payment lane or booth would be located toward a right side of the toll facility payment lanes.

In block 341, if it is determined that the vehicle can be autonomously driven to an open manned toll booth, the control system 12 autonomously drives the vehicle to an open manned toll booth lane, where payment may be made.

Referring back to block 313, if instructions exist for the toll payment to be made using a credit or debit card, control transfers to block 329. In block 329, the device 14 determines if the vehicle can be autonomously driven to a card payment lane. Simultaneously with execution of block 329 or otherwise after block 313, in block 351, the computing device 14 may generate a notification that the vehicle is approaching the toll facility. The notification may be a visual or audible notification presented, for example, via interface 109.

In block 343, if it is determined that the vehicle can be autonomously driven to a card payment lane, the control system 12 autonomously drives the vehicle to a card payment lane, where payment may be made.

Referring back to block 313, if no instructions exists for the toll payment to be made using a credit or debit card, a notification is generated (in block 351) that the vehicle is approaching a toll facility. Then, in block 317, a notification is generated (using the HMI 109) querying a user regarding the type of toll payment desired. Then, in block 319, if the user selects payment using a pre-paid/pass lane, control transfers to block 325 previously described. In block 321, if the user does not select payment using a pre-paid/pass lane but rather selects payment by cash, control transfers to block 327 previously described. In block 323, if the user does not select payment using cash but rather selects payment by card, control transfers to block 329 previously described.

FIG. 4 shows one example of an interactive screen display (such as a touch-screen) configured to enable user entry of instructions to be automatically executed whenever the vehicle is determined to be approaching a toll facility. If the user chooses to pay tolls using an E-Z Pass®, I-Pass or similar device, the user may touch field 415 to elect this payment option. This option will then be stored in memory as the preferred payment option. Then, when a toll facility is detected, user selection of this option will be detected in block 309 of FIG. 3. The computing device 14 and other vehicle systems will then proceed as previously described to block 325 and to appropriate blocks following block 325.

If the user chooses to pay tolls using cash, the user may touch field 420 to elect this payment option. This option will then be stored in memory as the preferred payment option. When a toll facility is detected, user selection of this option will be detected in block 311 of FIG. 3. The computing device 14 and other vehicle systems will then proceed to blocks 327 and 351 and then to appropriate blocks thereafter, as previously described with respect to FIG. 3.

If the user chooses to pay tolls using a credit/debit card, the user may touch field 425 to elect this payment option. This option will then be stored in memory as the preferred payment option. When a toll facility is detected, user selection of this option will be detected in block 313 of FIG. 3. The computing device 14 and other vehicle systems will then proceed to blocks 329 and 351 and then to appropriate blocks thereafter, as previously described with respect to FIG. 3.

If the user wishes to decide on a type of payment on a case-by-case basis, the user may touch field 430. This option will then be stored in memory as the preferred option for when a toll facility is detected. When the toll facility is detected, control will be effectively transferred to block 351, whereby the computing device 14 will generate a notification querying user regarding the type of toll payment desired. Control is then transferred to (and proceeds from) one of blocks 319, 321 or 323 depending on the type of payment selected.

Also, by selecting one or more of fields 435 and 440, the user may specify the type of notification (audio or visual) they will receive via the HMI 109, for example. A "reset" field 445 may be provided to enable the user to reset any payment options previously entered. An "exit" option 450 may also be provided to enable the user to exit the toll instruction menu.

Referring to FIG. 5, in another particular embodiment, computing device 14 is incorporated into a vehicle navigation system 29 including the computing device and navigation module 23. Elements 23 and 14 may be packaged together and configured to operate as described herein when operatively coupled to other vehicle systems and components as described elsewhere herein.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device for a vehicle, the vehicle including a steering control system, a braking control system, a throttle control system, and a motive power control system, the computing device comprising one or more processors for controlling operation of the computing device, and a memory for storing data and program instructions usable by the one or more processors, wherein the one or more processors are configured to execute instructions stored in the memory to:
determine when the vehicle is approaching a toll facility;
responsive to a determination that the vehicle is approaching a toll facility, determine if instructions with regard to a desired type of toll payment have been previously programmed;
responsive to a determination that instructions with regard to a desired type of toll payment have been previously programmed, acquire information relating to the toll facility, the information including locations of any payment lanes accepting the desired type of toll payment;
responsive to a determination that instructions with regard to a desired type of toll payment have been previously programmed, determine if, based on the acquired information relating to the toll facility, the vehicle can be autonomously driven into a payment lane accepting the desired type of toll payment; and
responsive to a determination that the vehicle can be autonomously driven into a payment lane accepting the desired type of toll payment, control operation of at least one of the steering control system, the braking control system, the throttle control system, and the motive power control system so as to guide the vehicle into the payment lane accepting the desired type of toll payment.

2. The computing device of claim 1 wherein the one or more processors are configured to execute instructions stored in the memory to, responsive to a determination that the vehicle cannot be autonomously driven into a payment lane that is in accordance with the type of toll payment desired, generate a notification that the vehicle cannot be autonomously driven into a payment lane that is in accordance with the type of toll payment desired.

3. The computing device of claim 1 wherein the type of toll payment desired is by a pre-paid pass, and wherein the one or more processors are configured to execute instructions stored in the memory to determine if, based on the acquired information, the vehicle can be autonomously driven into a pre-paid pass payment lane.

4. The computing device of claim 1 wherein the type of toll payment desired is by cash, and wherein the one or more processors are configured to execute instructions stored in the memory to:
generate a notification that the vehicle is approaching the toll facility; and
generate a notification querying a user as to whether the user will require change from the toll payment.

5. The computing device of claim 4 wherein the one or more processors are configured to execute instructions stored in the memory to determine, if the user will not require change from the toll payment and based on the available information, if the vehicle can be autonomously driven into an open manned payment lane.

6. The computing device of claim 1 wherein the type of toll payment desired is by a credit/debit card, and wherein the one or more processors are configured to execute instructions stored in the memory to:
generate a notification that the vehicle is approaching the toll facility; and
determine if, based on the acquired information, the vehicle can be autonomously driven into a credit/debit card payment lane.

7. A vehicle including the computing device of claim 1.

8. A vehicle navigation system including the computing device of claim 1.

9. A vehicle control system including the computing device of claim 1.

10. A method for navigating a vehicle through a toll facility, the vehicle including a steering control system, a braking control system, a throttle control system, and a motive power control system, the method comprising steps of:
determining when a vehicle is approaching a toll facility;
responsive to a determination that the vehicle is approaching a toll facility, determining if instructions with regard to a desired type of toll payment have been previously programmed;
responsive to a determination that instructions with regard to a desired type of toll payment have been previously programmed, acquiring information relating to the toll facility, the information including locations of any payment lanes accepting the desired type of toll payment;
responsive to a determination that instructions with regard to a desired type of toll payment have been previously programmed, determining if, based on the acquired information relating to the toll facility, the vehicle can be autonomously driven into a payment lane accepting the desired type of toll payment; and
responsive to a determination that the vehicle can be autonomously driven into a payment lane accepting the desired type of toll payment controlling operation of at least one of the steering control system, the braking control system, the throttle control system, and the motive power control system so as to guide the vehicle into the payment lane accepting the desired type of toll payment.

11. The method of claim 10 wherein the step of determining a type of toll payment desired comprises the step of determining if previously programmed instructions with regard to toll payment are stored in a memory.

12. The method of claim 11 further comprising the step of, if previously programmed instructions with regard to toll payment are not stored in the memory, generating a notification that the vehicle is approaching the toll facility.

13. The method of claim 11 wherein, if instructions with regard to a desired type of toll payment have been previously programmed, the step of determining a type of toll payment desired further comprises the step of determining if a pre-paid pass is to be used for payment.

14. The method of claim 13 wherein, if a pre-paid pass is to be used for payment, the step of determining if the vehicle can be autonomously driven into a payment lane accepting the desired type of toll payment comprises the step of determining if the vehicle can be autonomously driven into a pre-paid/pass toll lane.

15. The method of claim 11 wherein, if instructions with regard to a desired type of toll payment have been previously programmed, the step of determining a type of toll payment desired further comprises the step of determining if cash is to be used for payment.

16. The method of claim 15 further comprising the step of, if cash is to be used for payment, generating a notification querying a user as to whether the user will require change from the cash toll payment.

17. The method of claim 16 wherein, if the user will not require change from the cash toll payment, the step of determining if the vehicle can be autonomously driven into a payment lane accepting the desired type of toll payment comprises the step of determining if the vehicle can be autonomously driven into an automated cash payment lane.

18. The method of claim 16, further comprising the step of, if the user will require change from the cash toll payment, determining if vehicle can be autonomously driven to an open manned toll booth lane.

19. The method of claim 11 wherein, if instructions with regard to a desired type of toll payment have been previously programmed, the step of determining a type of toll payment desired further comprises the step of determining if a credit or debit card is to be used for payment.

20. The method of claim 19 wherein, if a credit or debit card is to be used for payment, the step of determining if the vehicle can be autonomously driven into a payment lane accepting the desired type of toll payment comprises the step of determining if the vehicle can be autonomously driven into a card payment lane.

\* \* \* \* \*